H. E. WARREN.
APPARATUS FOR REGULATING FREQUENCY.
APPLICATION FILED SEPT. 29, 1916.
1,390,318.
Patented Sept. 13, 1921.
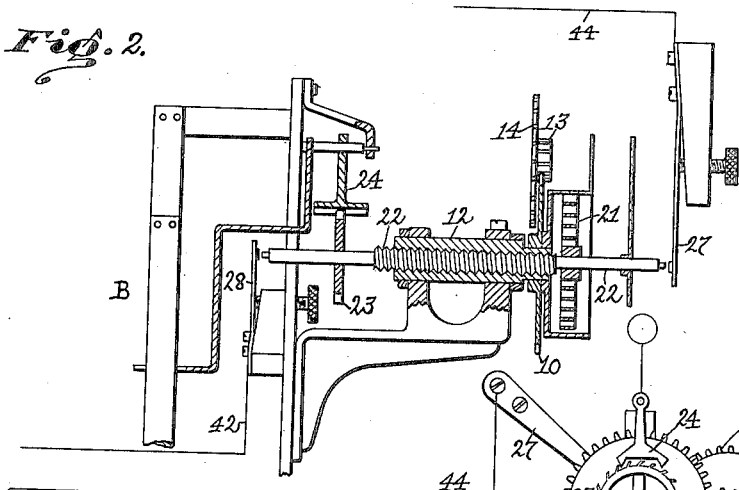
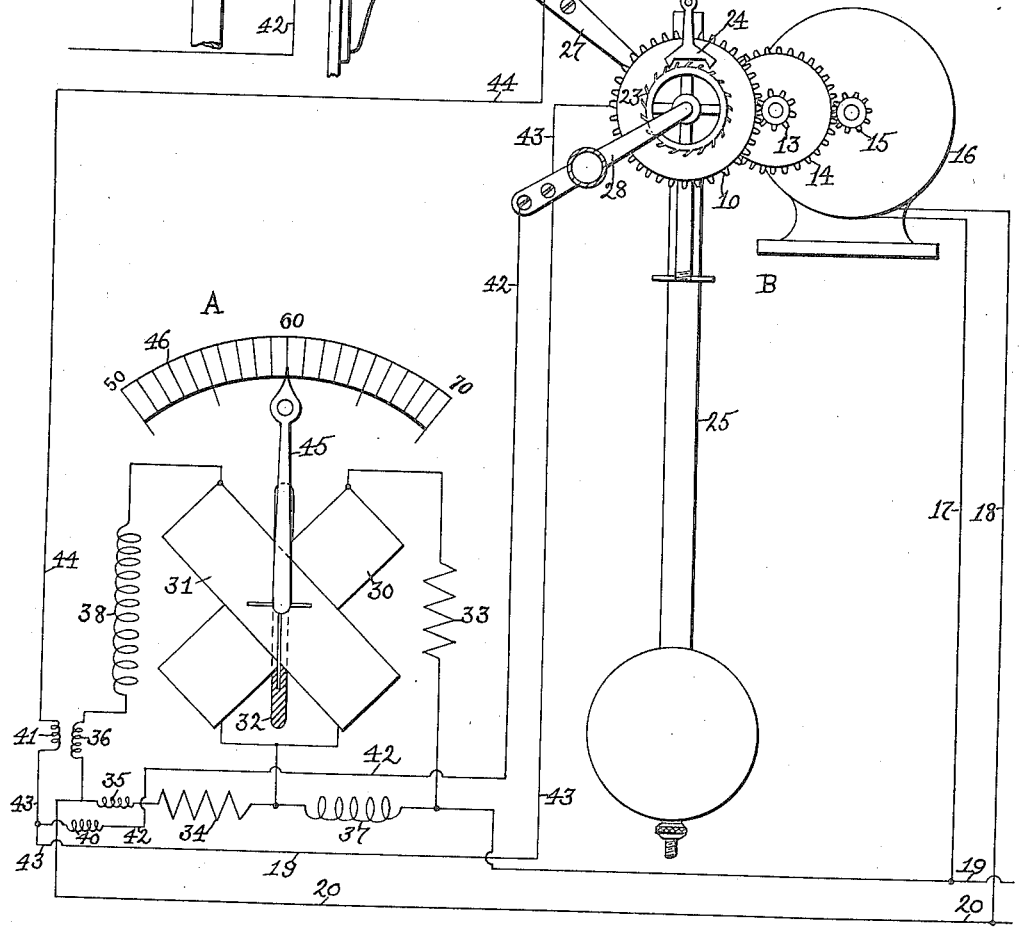
Inventor
Henry E. Warren
by Jas. H. Churchill
Atty.

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

APPARATUS FOR REGULATING FREQUENCY.

1,390,318.  Specification of Letters Patent.  Patented Sept. 13, 1921.

Application filed September 29, 1916. Serial No. 122,927.

*To all whom it may concern:*

Be it known that I, HENRY E. WARREN, a citizen of the United States, and a resident of Ashland, in the county of Middlesex and State of Massachusetts, have invented an Improvement in Apparatus for Regulating Frequency, of which the following description, in connection with the accompanying drawings, is a specification, like characters on the drawings representing like parts.

This invention relates to a novel apparatus for indicating the frequency of an alternating current.

The apparatus which may be preferred by me consists of a member driven by a synchronous motor and coöperating with a member driven by a time element, so that movement of one of said members with relation to the other is effected by a difference in relation between the synchronous motor and the time element, which movement of one of the said members is employed to automatically modify instantaneous readings of a frequency indicator provided with means for obtaining such modifications of the instantaneous readings of the frequency.

Prior to this invention I am aware that frequency indicators as made heretofore show, by means of a needle moving over a scale, the instantaneous value of the number of alternations during a small time-interval divided by that time-interval, but such frequency indicators as heretofore made and known to me, are inadequate for securing an exact average frequency over a long period of time, that is, to say, the total number of alternations during a substantial length of time divided by the time-durations in seconds.

In the present instance, I have provided a frequency indicator with which instantaneous readings of the frequency and also readings of the average frequency may be obtained, and have placed such frequency indicator under control of the apparatus above referred to, so as to be automatically operated thereby.

These and other features of this invention will be pointed out in the claims at the end of this specification.

Figure 1 is a diagrammatic view of the form of apparatus preferred by me for regulating frequency in accordance with this invention, and Fig. 2 represents in section and elevation the elements of the apparatus shown in Fig. 1, which may be located upon the switch-board in a power station, or at a distance therefrom.

In the present instance, I have shown a simple form of apparatus preferred by me and by means of which alternating current frequency may be regulated. The apparatus referred to may be considered as composed of two parts or members A, B, the member A being designed to be mounted upon the switch-board of a power station, and the member B being located at a distance from the member A and operatively connected therewith, as will be described.

The member B is represented as a composite clock having two interconnected movements, one of which consists of a gear 10 and sleeve 12 positively driven through gears 13, 14, 15, by a synchronous motor 16, which latter is connected by wires 17, 18, in the alternating current circuit represented by the wires 19, 20.

Flexibly driven from the sleeve 12 by means of a spring 21, is a threaded shaft 22 for an escapement wheel 23 forming part of the second movement or time element. The rate of motion of the escapement wheel 23 is controlled in an ordinary manner by an escapement device 24 and pendulum 25 of well-known construction. The inside of the sleeve 12 is threaded so as to engage loosely the threads upon the shaft 22. Mounted near the opposite ends of the shaft 22 are contactors or circuit terminals 27, 28, which will be engaged by the shaft 22 if the latter moves axially in one direction or another, but which are normally out of contact with said shaft.

The length of the pendulum 25 and the gearing from the motor 16 are so arranged that when the frequency of the alternating current is exactly normal, the sleeve 12 will revolve at exactly the same rate as the shaft 22, the latter being constantly impelled to turn by an initial rotation of the spring 21. So long as this condition continues, there will be an open circuit between the shaft 22 and the circuit terminals or contactors 27, 28.

When, however, the frequency of the alternating current deviates from the normal, even to a very small extent, the sleeve 12 will gradually gain or lose with respect to the shaft 22, and the relative motion of the two acting through the screw-threads will move the shaft 22 axially in one or the other direction and will cause the shaft 22 to make contact with the terminal 27 or 28.

In the arrangement of the element A or frequency indicator herein shown, 30, 31, represent two coils axially inclined, within the field of which there is a soft iron needle 32. Connected with these coils in the manner shown in Fig. 1, are resistances 33, 34, and reactances 35, 36, 37, 38, so as to form a Wheatstone bridge, which will be balanced at normal frequency but unbalanced at other frequencies.

The frequency indicator or element A as thus far described, is not herein claimed, as it is a well-known instrument.

I have, however, in the present invention improved upon the ordinary type of frequency indicator by introducing new elements under control of element B, namely, the composite clock above described, for the purpose of modifying the readings of the frequency indicator or element A through the action of the clock or element B.

In the present instance I have shown one arrangement for accomplishing this result, and to this end I have placed small secondary windings 40, 41, on the reactances 35, 36, and connect these secondary windings with the contactors 28, 27, and with the clock. As represented in Fig. 1, the secondary winding 40 has one end connected by the wire 42 with the contactor or terminal 28, and its other end connected by wire 43 with the clock, and the secondary winding 41 has one end connected by wire 44 with the contactor or terminal 27 and its other end to the wire 43. As a result, if the shaft 22 engages the contactor or terminal 28, the secondary winding 40 will be short-circuited, which will somewhat reduce the value of the reactance 35, and by disturbing the Wheatstone bridge will slightly alter the reading of the pointer 45 on the scale 46. Likewise contact of the shaft 22 with the terminal or contactor 27 will short-circuit the secondary winding 41 of the reactance 36 and cause the pointer 45 to be deflected slightly in the opposite direction.

Obviously a similar modification of the indications of the frequency meter can be made by direct mechanical connection between the composite clock and the motor A, by permitting the axial movement of the shaft 22 to shift slightly the graduated dial 46 or other means may be used to accomplish the same result.

In the present instance the composite clock or element B superposes upon the instantaneous reading of the frequency meter A, a positive or negative correction, which is due to an accumulated error in frequency above or below the normal average value. For example, if the normal frequency is 60.1 cycles per second as an average for thirty minutes, any standard form of frequency indicator as made hitherto would indicate a value so close to 60 that the deviation could scarcely be noted, especially since the pointer is always swinging slightly.

With an apparatus such as herein illustrated, the reading at first would be the same as with the standard instruments now in use, but after thirty minutes run at 60.1 cycles, the synchronous clock represented by the sleeve 12 would have gained three seconds over the standard clock or time element, represented by the shaft 22, and this would have caused contact to be made between the shaft 22 and the terminal or contactor 28, thereby short-circuiting the secondary winding 40, thus causing the pointer 45 to swing any desired predetermined amount, for example, one half division higher, so as to indicate 60.5, which would be easily readable, in place of 60.1, which could not easily be read.

In consequence of this amplification of the error in frequency, the switch board operator would slightly reduce the speed of the source of the alternating current, not shown, and, as soon as the average frequency had again been restored to its normal value, the short circuit of the secondary winding 40, would be removed by the composite clock and the frequency indicator would have its reading slightly reduced. On the other hand, if the number of cycles should fall below 60.1, the synchronous clock represented by the sleeve 12, would lose with respect to the standard clock or time element, represented by the shaft 22, and the latter would be moved in the opposite direction and engage the terminal or contactor 27, thereby short-circuiting the secondary winding 41 and causing the pointer 45 to swing, for example, one half division lower, so as to indicate 59.5, which would be easily readable by the operator, who would slightly increase the speed of the current generator, and as soon as the average frequency had again been restored to its normal value, the short circuit of the secondary winding 41 would be removed by the composite clock and the frequency indicator would have its readings slightly increased.

It will thus be seen, that by means of the present invention, it is perfectly feasible for a switch-board operator, without departing from the present methods and without appreciable extra efforts, to maintain an absolutely correct average frequency day after day and thus permit the use of synchronous clocks whose readings depend upon the value of the average frequency.

From the above description, it will be seen that the present invention utilizes the relative difference in motion between two devices, one of which is driven synchronously with the alternating current, and the other measures accurately the passage of time, and while it may be preferred to embody the movable devices in a composite clock, as herein shown, it is not desired to limit the invention in this respect, as I consider that any method of utilizing the relative motion of two devices which may be employed to mechanically or electrically magnify upon the dial of an indicating instrument, readings due to accumulated errors in frequency, to be within the scope of this invention.

Claims.

1. In combination, a device driven synchronously with an alternating current, a device measuring the passage of time, one of said devices being movable with relation to the other, and an indicator responsive to the alternations of said current and to relative movement of said devices.

2. In combination, an apparatus for indicating the frequency of an alternating current consisting of a meter independently capable of indicating the instantaneous value of the frequency, and an integrating device dependent upon the average frequency of the alternations, with interconnecting means between the integrating device and the meter, whereby errors in the average frequency above or below normal cause variations in the instantaneous readings of the meter.

3. In combination, an indicating device provided with a dial and a pointer, one of which is movable with relation to the other in response to changes in frequency of an alternating current, a clock, a device movable thereby, a synchronous motor, a device movable by said motor and coöperating with the device movable by the said clock to enable one of said devices to be moved relatively to the other by a variation in the relation of the clock and motor, said relatively movable device coöperating with said indicating device to effect movement of one of the members of the said indicating device in response to said variation between the clock and motor.

4. In combination, an indicating element having coöperating members, one of which is movable with relation to the other in response to changes in frequency of an alternating current, a second element capable of being located at a distance from the first-mentioned element and having coöperating devices, one of which is movable with relation to the other in response to difference between the frequency of said current and a time element, and means coöperating with said indicating element and with said relatively movable device to effect movement of one of the members of the indicating element and thereby indicate said difference.

5. In combination, an indicating element having coils and a device movable under the influence of said coils, reactances in circuit with said coils, secondary windings for said reactances, and means for short-circuiting said secondary windings, said means being responsive to variations in the relation of the frequency of the current flowing through said coils and means measuring the passage of time.

6. In combination, a rotatable shaft, a rotatable sleeve in threaded engagement with said shaft, means coöperating with said shaft to rotate the same, a synchronous motor connected with said sleeve for rotating it, and a frequency indicator under the influence of said shaft and responsive to axial movement of said shaft.

7. In an apparatus for showing frequency, means for obtaining instantaneous readings of the frequency, and means responsive to the value of the average frequency to modify the instantaneous reading.

8. In combination, an indicator, means responsive to the instantaneous value of the frequency of an alternating current, and means responsive to another function of the frequency, said two latter means coöperating jointly to determine the value indicated by the indicator.

9. In combination, an instrument responsive to the frequency of an alternating current and provided with means for indicating variations in said frequency, and means for automatically altering the indications of said instrument without interfering with its operation, said means comprising an element movable in response to said frequency and an element capable of being moved independently of said frequency but coöperating with the first-mentioned element to be influenced thereby.

In testimony whereof, I have signed my name to this specification.

HENRY E. WARREN.